(12) United States Patent
Chittella et al.

(10) Patent No.: US 10,796,089 B2
(45) Date of Patent: Oct. 6, 2020

(54) ENHANCED TIMED TEXT IN VIDEO STREAMING

(71) Applicant: SLING MEDIA PVT LTD, Bangalore (IN)

(72) Inventors: Kiran Chittella, Bangalore (IN); Yatish J. Naik Raikar, Bangalore (IN)

(73) Assignee: SLING MEDIA PVT. LTD, Bangalore (IN)

( * ) Notice: Subject to any disclaimer, the term of this patent is extended or adjusted under 35 U.S.C. 154(b) by 136 days.

(21) Appl. No.: 14/985,698

(22) Filed: Dec. 31, 2015

(65) Prior Publication Data

US 2016/0191959 A1    Jun. 30, 2016

Related U.S. Application Data

(60) Provisional application No. 62/098,675, filed on Dec. 31, 2014.

(51) Int. Cl.
| | | |
|---|---|---|
| *G06F 40/247* | (2020.01) | |
| *H04N 21/488* | (2011.01) | |
| *H04N 21/43* | (2011.01) | |
| *H04N 21/858* | (2011.01) | |
| *H04N 21/8405* | (2011.01) | |
| *H04N 21/431* | (2011.01) | |
| *H04N 21/234* | (2011.01) | |
| *H04N 21/23* | (2011.01) | |
| *H04N 21/235* | (2011.01) | |
| *H04N 21/242* | (2011.01) | |

(52) U.S. Cl.
CPC .......... *G06F 40/247* (2020.01); *H04N 21/23* (2013.01); *H04N 21/234* (2013.01); *H04N 21/2358* (2013.01); *H04N 21/23424* (2013.01); *H04N 21/4302* (2013.01); *H04N 21/4316* (2013.01); *H04N 21/4888* (2013.01); *H04N 21/8405* (2013.01); *H04N 21/8586* (2013.01); *H04N 21/242* (2013.01)

(58) Field of Classification Search
CPC ...................... H04N 21/4316; H04N 21/4884
See application file for complete search history.

(56) References Cited

U.S. PATENT DOCUMENTS 6,751,776 B1 * 6/2004 Gong ................ G06F 17/30616
707/E17.028
8,682,672 B1 * 3/2014 Ha ........................... G09B 5/02
704/235

(Continued)

OTHER PUBLICATIONS

Slang, n.3, Oxford English Dictionary, available at http://www.oed.com/view/Entry/181318?isAdvanced=false&result=3&rskey=fgVCYA& retrieved on Sep. 18, 2017.*

*Primary Examiner* — Justin E Shepard
(74) *Attorney, Agent, or Firm* — Lorenz & Kopf LLP

(57) ABSTRACT

Timed text that is provided in a television broadcast or media stream can be enhanced to provide an improved user experience. A scrollable text window can be provided in a media player application, for example, that can allow the user to quickly "catchup" from a missed moment. The timed text may be enhanced to allow links to dictionaries, encyclopedias, online sources, thesauruses, translating services, and/or the like. Further implementations could use automated tools to automatically generate program summaries for watched or unwatched content.

20 Claims, 4 Drawing Sheets

(56) References Cited

U.S. PATENT DOCUMENTS

| | | | |
|---|---|---|---|
| 8,745,683 B1* | 6/2014 | Maeng | H04N 21/435 725/110 |
| 2003/0065503 A1* | 4/2003 | Agnihotri | G06F 17/2705 704/7 |
| 2003/0192044 A1* | 10/2003 | Huntsman | H04N 7/162 725/25 |
| 2004/0006767 A1* | 1/2004 | Robson | H04N 7/0887 725/28 |
| 2005/0251832 A1* | 11/2005 | Chiueh | H04L 29/06027 725/62 |
| 2009/0185074 A1* | 7/2009 | Streijl | H04N 7/0885 348/468 |
| 2010/0082658 A1* | 4/2010 | Athsani | G06F 16/33 707/767 |
| 2010/0322391 A1* | 12/2010 | Michaelis | H04M 3/42391 379/45 |
| 2011/0283243 A1* | 11/2011 | Eckhardt | G06F 3/04886 715/865 |
| 2012/0159537 A1 | 6/2012 | Casagrande et al. | |
| 2012/0320267 A1 | 12/2012 | Landow | |
| 2014/0071342 A1* | 3/2014 | Winograd | H04N 5/44 348/383 |
| 2015/0046148 A1* | 2/2015 | Oh | H04N 5/44591 704/3 |

* cited by examiner

ENHANCED TIMED TEXT IN VIDEO STREAMING

PRIORITY CLAIM

This application claims priority to U.S. Provisional Application Ser. No. 62/098,675 filed on Dec. 31, 2014, which is incorporated herein by reference.

TECHNICAL FIELD

The following discussion generally relates to the processing of closed captioning or other timed text information associated with television broadcasts, media streams and/or other media programming.

BACKGROUND

Viewers now watch television content received from many different sources. In addition to conventional direct broadcast satellite (DBS), cable or terrestrial television broadcasts, content is now available from any number of streaming services (e.g., video on demand (VOD) services) and the like. Moreover, many viewers now make use of time shifting devices (e.g., local storage or remote storage digital video recorders (DVRs)) and/or placeshifting devices. In a typical placeshifting setting, a placeshifting device encodes a live media stream for real-time (or even faster than real-time) delivery to a viewer. The live stream may encode a previously-stored program, a live broadcast, and/or any other content as desired. With the advent of these new technologies, media content is now viewable not only on televisions, but also on mobile phones, tablets, computer systems, video game players, media players and any number of other devices.

With the emergence of new media player types and capabilities, it is now possible to provide additional services and/or to enhance the viewer's media experience. Further, modern "smart" televisions are capable of providing more advanced features beyond mere playback of received broadcasts. It is therefore desirable to provide systems, devices and/or processes that improve the experience of viewing media content on a television or other device. These and other desirable features and characteristics will become apparent from the subsequent detailed description and the appended claims, taken in conjunction with the accompanying drawings and this background section.

BRIEF SUMMARY

According to various exemplary embodiments, systems, devices and methods are described to process timed text that is associated with television, media stream and/or other video programming.

Various embodiments provide a process executable by a media player device having a processor, memory and an interface to a network to process timed text that is associated with television programming. The process suitably comprises: receiving, at the media player, a program stream that comprises video content associated with a particular program and a timed text stream that comprises textual data associated with the particular program; providing the video content associated with the particular program in a first window to a display for presentation to the viewer; and simultaneously providing the timed text stream in a second window different from the first window for presentation to the viewer, wherein the timed text stream is presented in the second window to be scrollable such that the viewer is able to scroll back to view dialog occurring prior to a current scene of the particular program.

Other embodiments relate to processes to automatically replace certain words (e.g., slang) within the timed text stream, or to enhance the timed text stream with links or other additional information from a web site or other source. Still other embodiments relate to processes by which the media player, television receiver or another computing device is able to automatically construct a summary of a program from the timed text data of the program. The automatically-generated summary may be presented to the viewer as the program is in progress so that the viewer is quickly brought current as to earlier developments in the program, for example.

Still other embodiments relate to media player applications and devices that implement the various processes described herein, or to other computing systems and devices that implement the various automated processes set forth herein.

Additional embodiments, aspects and other features are described in more detail below.

BRIEF DESCRIPTION OF THE DRAWING FIGURES

Example embodiments will hereinafter be described in conjunction with the following drawing figures, wherein like numerals denote like elements, and FIG. 1 is a diagram of an example system for providing enhanced closed caption features in a placeshifting or other streaming media environment;

DETAILED DESCRIPTION

Figure 1:
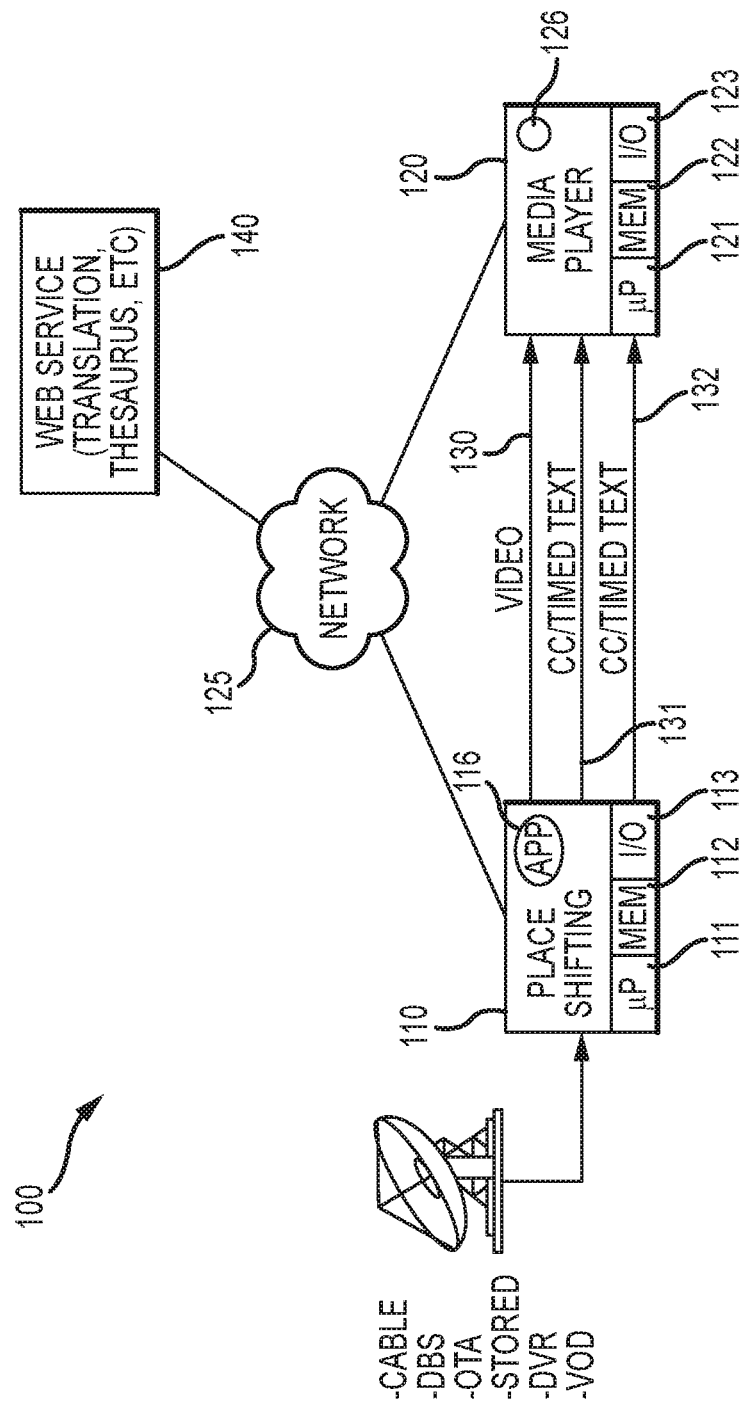

The following detailed description of the invention is merely exemplary in nature and is not intended to limit the invention or the application and uses of the invention. Furthermore, there is no intention to be bound by any theory presented in the preceding background or the following detailed description.

Timed text that is provided in a television broadcast or media stream can be used to provide an improved user experience. A scrollable text window that presents the timed text can be provided, for example, that can allow the user to quickly "catchup" from a missed moment or to see a word or phrase that might have been difficult to understand. In some embodiments, timed text may be enhanced to allow URLs or other links to dictionaries, Wikipedia, online sources, thesauruses, translating services, and/or the like. Further embodiments could use automated tools to automatically generate program summaries for watched content. Various features may be particularly useful in a placeshifting setting wherein media streams are encoded and transmitted across a network for remote viewing; other embodiments may be used in set top boxes, television receivers, media players and/or other devices and systems as desired.

According to various examples, processes for presenting one or more running streams of closed captioning (CC) or other timed text (TT) data in vertical or other windows are described. These windows may appear similar to an instant message chat window, in some embodiments, and may be shown along with the running video on a media player client (e.g. a mobile phone, tablet or other device) or other display as desired. The timed text window may be activated or deactivated by the user, as desired.

The caption transcript can be used by the user to quickly get a grasp of any missed conversation, dialog or other events in the video without the need to seek backward to the missed location in the video (which can be disruptive to other viewers). This may be particularly useful for viewers who are not fluent in the language of the program, since may such viewers may be able to read certain languages at a faster rate and/or a more fluent level than they can listen and understand spoken language. The caption transcript may also be helpful in recognizing or comprehending slang terms that even a more fluent speaker may not understand.

In further embodiments, the transcript can be post-processed so that interesting keywords are detected and highlighted as smart tags that provide a quick info/link/glossary for the word. That is, the viewer may be able to obtain more information about a word or phrase that is presented in the TT content. The word may be a player name in a sporting event, for example, which could link to sports statistics or other information about that player. Other embodiments could simply link to thesaurus or dictionary entries for certain words, or to synonyms for certain words or phrases to improve reader/viewer comprehension. To that end, some embodiments could connect a keyword in the caption text to an HTML, XML and/or other link that is clickable by the user to open a web search, dictionary entry, Wikipedia or other informational webpage, and/or other information about the linked word.

The thesaurus function could be further automated, as desired. In some embodiments, certain words (e.g., slang) may be replaced entirely with words that have clearer meanings. If a movie or TV program uses American slang, for example, certain words may be ambiguous or unclear when the program is broadcast or streamed in other countries. Even fluent English speakers may not be used to current slang from other geographic locations, so certain words that would be unfamiliar or otherwise difficult to understand in the local region could be automatically replaced in the caption window with words that are more common or that are more likely to be understood. Difficult words can therefore be replaced with other words in the same or a different language to make the meaning clearer.

Various embodiments alternately or additionally provide an automatic transcript feature that is prepared from the caption text. This transcript can be further processed using automated tools to generate a summary description of the watched content. Such summaries may be especially useful for sports programs, although automatic summaries could be equivalently created for other programs as well.

To that end, a typical television viewer often subscribes to multiple channels each having different types of programs (sports, movies, games, comedies etc.). If a user is interested to know about a particular program, the electronic program guide (EPG) typically provides only a vague description about the program in just a few lines of text that may be inadequate to satisfy the viewer's desire for information about the program. Moreover, if a user joins a particular program that is already in progress, he or she has no idea of the sequence of events that may have occurred during the earlier programming. By generating a summary (e.g., a précis) that is extracted from the close captioning or the subtitles associated with the program, a more detailed description of the part of the program that the user has missed can be provided. This summary can be generated by the television receiver or media client, if desired, and presented to potential viewers before or during a broadcast to give a more accurate description of the content. Other embodiments could generate automatic summaries at a separate server (e.g., a network server) that distributes summaries as desired. Each of these different embodiments is described more fully below.

Turning now to the drawing figures and with initial reference to FIG. 1, an example system 100 to deliver media content with enhanced timed text features is shown. Although FIG. 1 relates primarily to a placeshifting scenario for ease of illustration, equivalent embodiments could apply the concepts herein to any conventional media viewing environment, such as broadcast (including cable or DBS broadcast) television, stored media, video on demand, and/or the like.

The example system 100 illustrated in FIG. 1 suitably includes a media player 120 that executes a media application 126 for processing video and/or text streams received from any appropriate sources. Such sources could include, without limitation, any sort of broadcast, stored media and/or streaming sources, such as the placeshifting device no shown in FIG. 1. Media player 120 typically includes a conventional processor 121, memory 122 and input/output interfaces 123 that are commonly associated with a mobile phone, media player device, tablet computer, personal computer, video game player, television receiver, television and/or other device 120 as desired.

Placeshifting device 110 is similarly implemented using conventional hardware, such as a processor 111, memory 112 and input/output interfaces 113 as desired to implement the various functions described herein. Typically, placeshifting device 110 executes a placeshifting server application 116 that controls the encoding of video and the delivery of encoded video to the remote player device 110. In various embodiments, placeshifting device no is a standalone device such as any of the various SLINGBOX devices available from Sling Media Inc. of Foster City, Calif., although any number of other devices could be equivalently used. Other placeshifting devices no are integrated within set top boxes (STBs), television receivers, media players and/or other consumer-type hardware components that are available from any number of different sources.

Generally speaking, the placeshifting device 120 receives one or more media streams from a content source (e.g., a DVR, television receiver, stored media player, VOD source, and/or the like). Device 120 suitably converts the received stream(s) into a format that can be routed over network 125 to media player application 126 executing on media player device 120.

In the example of FIG. 1, placeshifting device 110 obtains and encodes a primary media stream 130 that is delivered to the media player 120. This stream 130 represents the then-current program that is being presented on the media player 120. In various embodiments, timed text may already be encoded into the primary stream 130, so no additional efforts are required by the placeshifting device 110. In other embodiments, a distinct timed text stream 131 may be separately encoded and transmitted to the media player 120, as desired. Timed text stream 131 may encode the timed text stream associated with the primary program (i.e., the same program delivered in stream 130), or with a different program, as described more fully below. Any number of additional streams 131, 132 may be provided to allow the viewer to monitor any number of additional programs in addition to the primary program stream.

The media player application 126 suitably receives the streams 130-132, decodes the content, and presents the content as appropriate. In various embodiments, timed text streams are presented in separate windows from the video content; these separate windows may be activated or deactivated by the viewer as desired. In various embodiments, each of the timed text windows suitably includes a scroll feature that allows the viewer to scroll back and view dialog or other events that have already occurred. Various embodiments could present multiple caption windows so that multiple programs can be monitored on the same display. Still other embodiments may use the secondary text streams to generate summaries of programs that may be viewed in the future, or for other purposes as desired.

Caption data may be processed using any format. All broadcast television programming in the United States and many other nations must now include closed caption information. For conventional digital (e.g., ATSC) television broadcasts, caption streams are typically encoded in a well-known format such as EIA-608 format, EIA-708 format, and/or the like. Other closed captioning formats or standards may be implemented in the United States or elsewhere.

Closed captioning typically refers to text delivered in conjunction with a television program or other programming content that allows viewers to access additional or interpretive information about programming content. Closed captions often provide textual transcriptions of the audio portions of programs as the programs progress, thereby allowing the hearing impaired and others to follow the program content without listening to the audio track typically associated with the programming. Motion pictures, video disk (e.g., DVD, Blu-ray) content, streamed audio/video, video games and the like may similarly incorporate closed captions using any number of standard or non-standard techniques. Closed caption/timed text often uses the presentation time stamps (PTSs) of conventional MPEG bundles to synchronize the text to the rest of the media program, although other standards may use other synchronization features, as desired.

As more and more consumers receive their television programming from broadband sources, the Society of Motion Picture and Television Engineers (SMPTE) and others have recommended a transition from the older standards (e.g., EIA 608/708) to more advanced "timed text" formats such as SMPTE-TT. This newer timed text format incorporates syntax, structures and tags similar to the extensible markup language (XML) to provide more advanced features and to improve flexibility in comparison to the more traditional legacy formats. The SMPTE-TT format is described in SMPTE Standard ST 2052-1-2010, which was approved on Dec. 3, 2010. The concepts set forth herein may be applied using any type of timed text/closed caption formatting, as appropriate.

Figure 2:
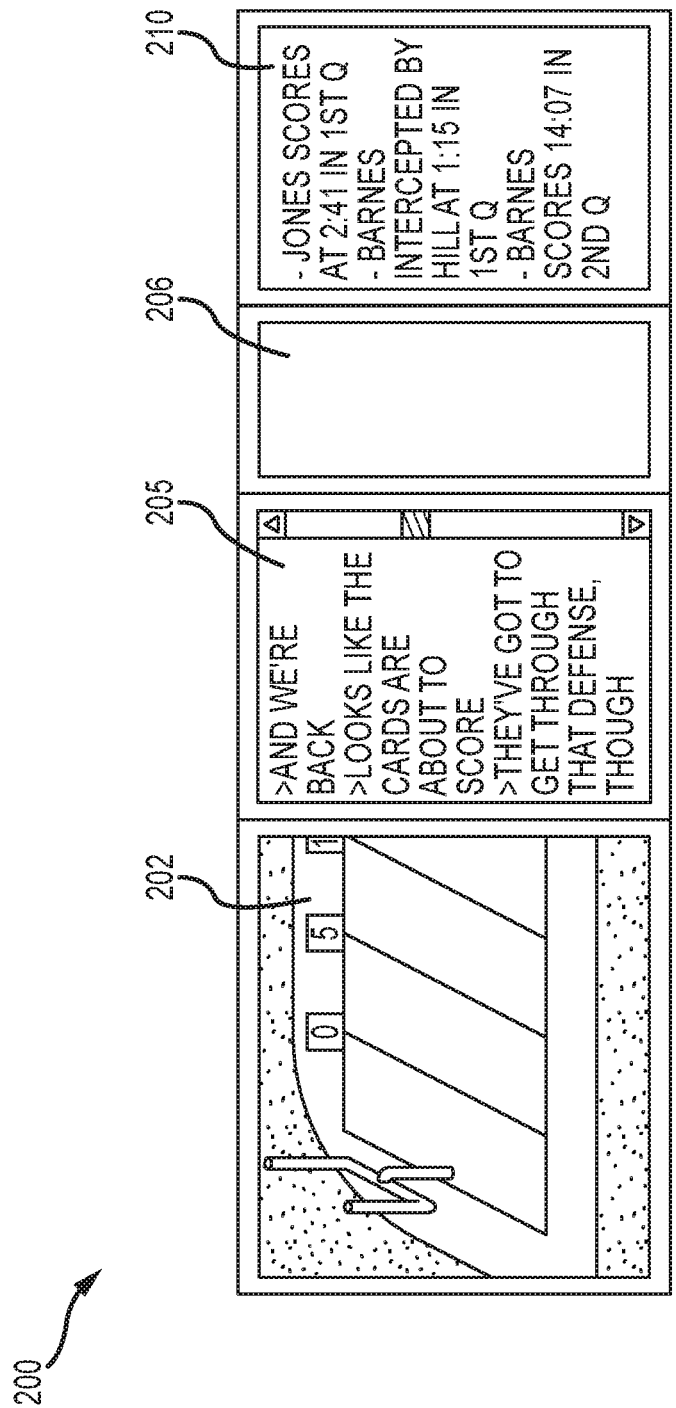
FIG. 2 is a diagram of an example interface that is viewable on a media player to incorporate scrollable timed text content.

FIG. 2 shows an example display in which a text stream (e.g., stream 131) is presented in a window 205 along with a window 202 showing a video stream (e.g., stream 130). In this example, the user may be able to manipulate a scroll bar, arrows or other interface feature(s) to scroll back and read timed text that occurred in the past. The amount of timed text that is buffered or stored for scrolling may vary from embodiment to embodiment, but ideally the window would allow scrolling back as far as the viewer is likely to be interested, such as to the beginning of the program, or at least as far as possible, given any storage or other constraints. Other embodiments may discard the timed text content after an appropriate period of time has elapsed or after an appropriate amount of storage space has been consumed, as desired.

The example 200 of FIG. 2 also shows windows 206 and 210 for viewing additional text streams and/or summaries of program content, respectively. Windows 206 and 210 are optional, and may not be present in all embodiments; other features of FIG. 2 may be supplemented, modified and/or omitted in other embodiments as desired. Conversely, additional windows similar to window 206 or 210 could be provided to allow simultaneous monitoring of additional text streams and/or summaries for other programs, as desired. In the illustrated example, window 206 presents timed text for a different program other than the program presented in windows 202 and 205. This allows the viewer to monitor a second program while watching a first program; this may be helpful, for example, during sports programming where a user may want to watch one game while closely monitoring the progress of a second game that is broadcast at the same time.

The summary window 210 presents summary data that may be automatically generated at media player 120 and/or provided from any other source. An example process to create a summary is presented below with respect to FIG. 4

FIG. 2 illustrates one interface in which the timed text for a program is presented in a window 205 that is physically distinct from the video image window 202 to prevent obscuring the action and to allow independent interaction with the text apart from the video. In contrast to conventional closed caption receivers that present closed captions as overlays on top of the video programming, text can simply be added to a scrolling window in a manner similar to an instant message window. That is, additional dialog or other timed text entries can be added to the list in window 205 at the appropriate time (as indicated by presentation time stamp (PTS) and/or other time indices) rather than simply being presented for a limited period of time as an overlay on top of video window 202, as in conventional closed caption viewing. That is, newer TT data can be added to the bottom of a scrollable window or the like rather than overwriting prior data. This provides a substantial benefit to the user because it avoids obscuring the video and it allows the text to be used even after the scene in which the text was displayed is over. This may also allow viewers who are more proficient with written language than spoken language to more closely and accurately follow along with the program, since they can now scroll back and read the timed text at their own pace.

Figure 3:
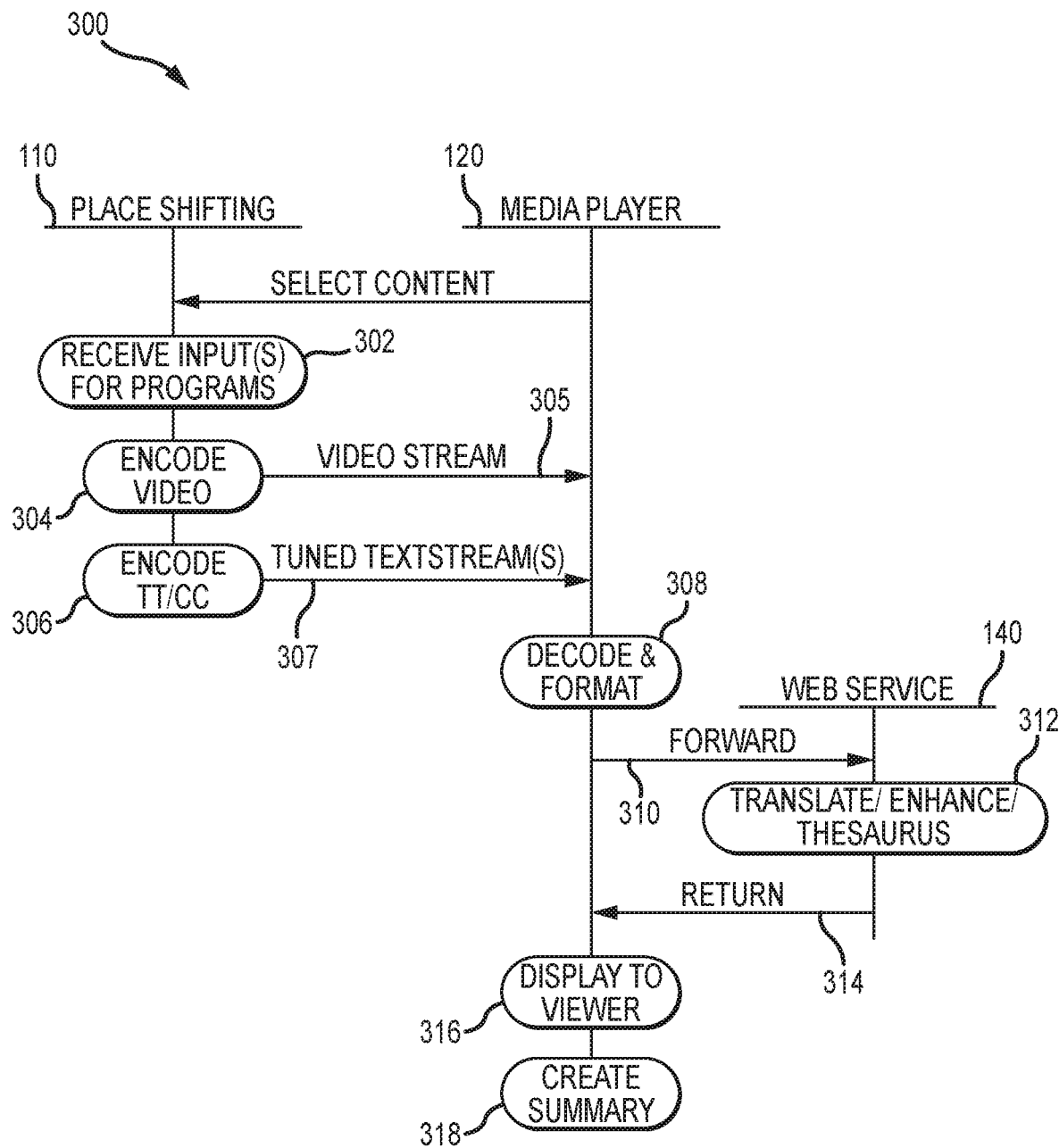
FIG. 3 is a diagram showing an example process for processing enhanced timed text.

FIG. 3 shows an example process 300 to deliver and enhance timed text within the placeshifting setting. With reference now to FIG. 3, an example process to placeshift timed text suitably includes the user operating media player application 126 at media player 120 to select a desired program for placeshifted viewing (function 301). The media player application 126 provides a description of the selected program to the placeshifting device no which obtains the requested programming from a DVR, television tuner or other available content source (function 302). The placeshifting device encodes the video as appropriate (function 304) for transmittal on network 125. The encoded video content 305 (corresponding to stream 130 in FIG. 1) is transmitted across network 125 to media player application 126 for decoding and presentation to the viewer.

Timed text is transmitted to the media player 120 in any manner. In the example of FIG. 3, timed text is separately encoded (function 306) by placeshifting device no and delivered 307 as a separate stream. Other embodiments will include the timed text with the primary video stream, e.g., as an MPEG multiplex or the like, rather than providing separate streams 305 and 307, so that the media player is able to extract the timed text from the primary stream.

The media player application 126 decodes the received content and formats an appropriate display (function 308). In various embodiments, the timed text is presented in a separate scrollable window 205 that is adjacent to the video display window 202, as described above. Other timed text windows 206, summary windows 210 and/or other information may be additionally provided.

In various embodiments, at least some of the words or phrases in the timed text window 205 may be marked with an HTML link or otherwise highlighted to indicate that additional information is available. In such implementations, the media player 120 typically contacts an external web service 140 for additional information or processing. The HTML link may reference a uniform resource locator (URL) on the Internet or another network, for example, that provides additional information about the word, phrase, or other item identified by the text. An athlete's name, for example, could be hot linked to a web page providing statistics or other information about that athlete. Actor/actress names, director names, or other persons could be similarly tagged to provide ready access to additional information. Other items could be linked to an encyclopedia page or other reference source for more information about the item, or words could be hot linked to a dictionary or thesaurus service (e.g., web service 140) that provides additional information about the linked words. Content could be selected for highlights or links in any manner; in various embodiments, an electronic program guide (EPG) or the like provides a table of keywords to be highlighted, along with URLs or other addresses to be referenced when the highlighted keyword is activated by the viewer.

In some implementations, the media player 120 simply contacts the external web service (function 310) as desired to resolve URL links or to obtain requested data. Web service 140 processes the request (function 312) and returns the requested data as appropriate (function 314). A dictionary or thesaurus service 140, for example, could receive a web query 310 that identified a particular word or phrase, and response 314 could include additional information about that particular word or phrase. The media player 120 would format the received information as appropriate for presentation to the viewer.

Other services 140 could provide translation or word replacement services, as appropriate. As noted above, some viewers may not be familiar with dialects, slang or other words of a particular language. This can be particularly true when a program is shown in a country other than where it was created. Text relating to slang terms (e.g., "totes cray", "amazeballs") from one country or region, for example, could be automatically replaced with more readily understood terms (e.g., "totally crazy", "amazing") for viewers in other regions. This would allow the viewer to readily ascertain the meaning from the timed text even though the original audio still contains the more obscure term. Replacement terms may be automatically supplied to media player 120 in response to media player application 126 noticing certain terms in the timed text. In some embodiments, media player application 126 could tag/highlight terms that do not appear in a dictionary of conventional words so that additional information 314 is obtained when the user clicks on a highlighted term. Other embodiments could implement the automatic word replacement feature within application 126 (e.g., by supplying a table of words and suitable replacements to application 126). Word replacement in this manner could also be useful for removing or softening harsh language, words or phrases that are offensive, or other words or phrases in the timed text that are undesirable for any reason.

The decode video and text data is presented to the viewer in any manner (function 316). In various embodiments, an interface such as that shown in FIG. 2 is provided to the display so that text data is presented simultaneously with the video imagery, but in a non-obtrusive manner that allows for scrolling back to prior scenes without rewinding the video presentation.

A program summary may also be automatically created, as desired (function 318). The summary may be created by the receiver or media player as the program is received by simply aggregating text entries that are of particular relevance. Alternately, summaries may be generated by the placeshifter, by broadcast or distribution services, or by any other service that is remotely accessible to the media player or other viewing device.

Figure 4:
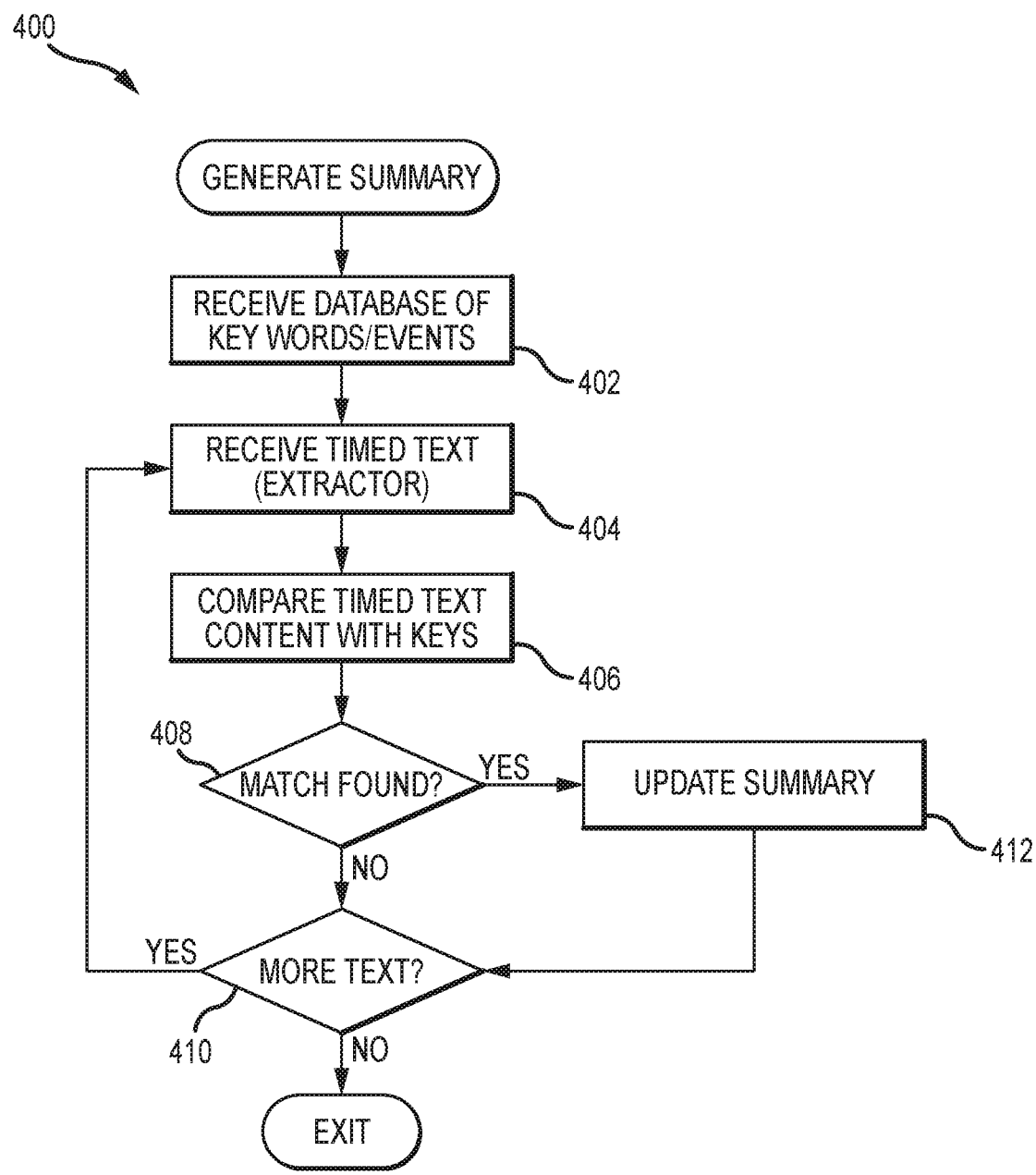
FIG. 4 is a diagram showing an example process for generating a summary of a media program using timed text content.

FIG. 4 shows a process 400 that could be executed by media player 110, placeshifting device 120 and/or by another data processing system to automatically generate a program summary from timed text. In various embodiments, process 400 is executed by media player application 126 on media player device 120.

Typically, various types of programs (e.g., American football game, European football game, cricket match, soap opera, adventure show, news broadcast, etc.) can be associated with a set of key words or events that may occur during the course of the program and that would be relevant to include in a program summary. A sporting match, for example, might summarize scoring events, near scoring events, penalties, turnovers or other events of significance. These events could be associated with trigger words that are likely to occur within the timed text. Trigger words for American football, for example, could include "touchdown", "fumble", "turnover", "third" or "fourth down", "interception" and/or the like. Finding trigger words in the timed text, then, can lead to updates of a program summary.

In the example of FIG. 4, the automatic summary generator (e.g., media player application 126) receives a database of key words or events for the program being summarized (function 402). The key words/events may be tied to the particular type of program, as desired.

As the program text is received, an extractor module receives the timed text (function 404) and monitors the text for an occurrence of the key words/events identified in the database (function 406). In various embodiments, the summary event may be triggered using any sort of artificial intelligence that considers multiple timed text entries (e.g., corresponding to commentator dialog, or the like).

If a match is found in the timed text (function 408), then summary text may be extracted and/or generic text associated with the identified event may be added (function 412). The generic text may be a simple description of the event (e.g., "touchdown scored by TeamA"), which may be provided along with the time the event occurred in some embodiments.

Automatic summary generation may continue as desired (function 410). In various embodiments, summaries may be automatically generated even for programs that are not viewed. If a viewer comes to a program already in progress, for example, an automatic text summary can allow the viewer to catch up very quickly. Alternatively, text summaries can be used for programs that the viewer does not want to watch, but does want to know the sequence of events occurring (e.g., sporting games, etc.).

To generate a précis/summary, at least two software modules could be created: a closed captioning (CC)/subtitles extractor and a summary generator. The extractor module would go through the video and parse out the CC/subtitle data, in the case of a live channel this will happen on the fly. The summary generator module will then go through the extracted text and create a summary using the key text, key text can be found based on the usage of the text or by referring to key moments from Video and audio data. Whenever the viewer requests program info, the detailed summary can be provided so the user knows exactly what events that have occurred. This can be further improved to provide user more comprehensive summary of a TV show when a user starts watching a program mid-season.

Placeshifting of text streams may therefore be used to supplement or enhance the media viewing experience. Since only the timed text needs to be transported to the remote viewer, the amount of bandwidth consumed is substantially less than would be consumed for placeshifted video. Even if video content is not provided with the stream, the media player (or another source) can process the text to provide any number of useful features for the viewer.

The various embodiments described herein may be independently implemented and/or interchangeable mixed and matched with each other in any manner. Scrolling timed text windows could be augmented with word replacement features, for example, as well as automated summary generation capabilities. Conversely, automated summaries and/or word replacement or highlighting may be implemented even when separate timed text windows or other displays are not available.

The general concepts set forth herein may be equivalently applied in any number of different embodiments. Displaying of scrollable timed text, automatic word substitution and/or automatic summary features are not limited to placeshifting applications, but may be used in any television or other media viewing environment. The various interfaces and other features described herein are not limited to placeshifting and media streaming applications, but may be used in conventional television viewing or media watching, as desired. Other applications, modifications and enhancements may be considered in any number of other equivalent embodiments.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A process executable by a media player device to automatically process timed text received with broadcast television programming, the process comprising:

receiving, at the media player device, a television broadcast that comprises video content associated with a particular television program and a timed text stream that comprises textual data associated with the particular television program;

receiving a list of words, wherein the list of words comprises words in the textual data to be replaced and, for each of the words in the textual data to be replaced, an associated replacement word to be inserted in place of the word to be replaced;

processing the received television broadcast by the media player device to thereby extract the video content and the textual data of the timed text stream from the television broadcast;

providing the video content associated with the particular television program in a first window to a display for presentation to the viewer; and while providing the video content in the first window, the media player device simultaneously providing the timed text stream in a second window different from the first window for presentation to the viewer, wherein the timed text stream is presented by the media player device in the second window to be scrollable such that the viewer is able to scroll back to view dialog occurring prior to a current scene of the particular television program, and wherein the media player device automatically scans the timed text stream to identify occurrences of the words in the list and, upon identifying a word to be replaced, automatically replaces the word to be replaced in the timed text stream with its associated replacement word.

2. The process of claim 1 wherein the words in the textual data to be replaced comprise slang words that are unique to a different geographic region.

3. The process of claim 2 wherein the list of words to be replaced comprises words from a geographical region that are different from words used in a geographic region associated with the viewer.

4. The process of claim 3 wherein the media player device replaces the words in the timed text with different words that are more familiar in the geographic region of the viewer.

5. The process of claim 1 further comprising the media player enhancing certain words of the timed text stream with links to additional information.

6. The process of claim 5 wherein the links are uniform resource locators to web sites presenting additional information about the certain words of the timed text stream.

7. The process of claim 6 further comprising the media player device receiving a list of the certain words to be detected and highlighted, and wherein the certain words of the timed text stream are detected and highlighted by the media player.

8. The process of claim 1 further comprising the media player device automatically creating a summary of the particular television program from the timed text stream that is associated with the television program.

9. The process of claim 8 wherein the automatically creating comprises the media player device scanning the timed text stream for keywords, and, in response to locating one of the keywords, the media player device triggering an entry for the automatically-created summary of the television program.

10. A media player device having a processor, a memory and an interface to a digital network, wherein the memory stores a computer-executable program that, when executed by the processor, automatically process timed text that is associated with television programming using an automated process that comprises:

receiving, at the media player device, a television broadcast that comprises video content associated with a particular television program and a timed text stream that comprises textual data associated with the particular television program;

separately receiving a list of words, wherein the list of words comprises words in the textual data to be replaced and, for each of the words to be replaced, an associated replacement word to be inserted in place of the word to be replaced;

processing the received television broadcast by the media player device to thereby extract the video content and the textual data frem of the timed text stream from the television broadcast;

providing the video content associated with the particular television program in a first window to a display for presentation to the viewer; and while providing the video content in the first window, simultaneously providing the timed text stream in a second window different from the first window for presentation to the viewer, wherein the timed text stream is presented by the media player device in the second window to be scrollable such that the viewer is able to scroll back to view dialog occurring prior to a current scene of the particular television program, and wherein the media player device automatically scans the timed text stream to identify occurrences of the words in the list and, upon identifying a word to be replaced, automatically replaces the word in the timed text stream with its associated replacement word.

11. The media player device of claim 10 wherein the words in the textual data to be replaced comprise slang words that are associated with a different geographic region.

12. The media player device of claim 11 wherein the list of words to be replaced comprises words from an other geographical region that are different from words associated with a geographic region favored by the viewer.

13. The media player device of claim 12 wherein the media player device replaces the words from the other geographical region with different replacement words that are more familiar to the viewer than the words to be replaced.

14. The media player device of claim 10 further comprising the media player enhancing certain words of the timed text stream with links to additional information.

15. The media player device of claim 14 wherein the links are uniform resource locators to web sites presenting additional information about the certain words of the timed text stream.

16. The media player device of claim 15 further comprising the media player device receiving a list of the certain words to be detected and highlighted, and wherein the certain words of the timed text stream are detected and highlighted by the media player.

17. The media player device of claim 10 further comprising the media player device automatically creating a summary of a television program from the timed text stream that is associated with the television program.

18. The media player device of claim 17 wherein the automatically creating comprises the media player device scanning the timed text stream for keywords, and, in response to locating one of the keywords, the media player device triggering an entry for the automatically-created summary of the television program.

19. A process executable by a viewer-operated media player device to present broadcast television programming to a viewer, the process comprising:

receiving, at the media player device, a television broadcast that comprises video content associated with a particular television program and a timed text stream that comprises textual data associated with the particular television program, wherein the particular television program originated at an other geographical area that is different from a geographical area in which the particular program is broadcast;

receiving a list of words by the viewer-operated media player device, wherein the list of words comprises words in the textual data to be replaced and replacement words to be inserted in place of the words to be replaced, wherein the words to be replaced are associated with the other geographical area, and wherein each of the words to be replaced is associated with a replacement word that is associated with the geographical area in which the particular program is broadcast;

processing the received television broadcast by the viewer-operated media player device to thereby extract the video content and the textual data of the timed text stream from the television broadcast;

providing the video content associated with the particular television program in a first window to a display for presentation to the viewer; and while providing the video content in the first window, the media player device simultaneously providing the extracted timed text stream in a second window different from the first window for presentation to the viewer, wherein the timed text stream is presented by the media player device in the second window to be scrollable such that the viewer is able to scroll back to view dialog occurring prior to a current scene of the particular television program, and wherein the viewer-operated media player device automatically scans the timed text stream to identify occurrences of the words in the list and, upon identifying a word in the timed text stream to be replaced, automatically replaces the words of the other geographical region in the timed text stream with the associated replacement words that are associated with the geographical area in which the particular program is broadcast.

20. The process of claim 19 wherein the words to be replaced are slang words associated with the other geographical area.

* * * * *